INVENTOR
JAMES W. TOENSING

INVENTOR
JAMES W. TOENSING

United States Patent Office 3,373,912
Patented Mar. 19, 1968

3,373,912
AUTOMATIC POSITIONING OF CONTINUOUSLY MOVING WEBBING
James W. Toensing, Minneapolis, Minn., assignor, by mesne assignments, to Buckbee-Mears Company, St. Paul, Minn., a corporation of Minnesota
Filed Oct. 14, 1965, Ser. No. 495,955
11 Claims. (Cl. 226—20)

ABSTRACT OF THE DISCLOSURE

For handling a strip of webbing which is continuously moving lengthwise, rollers are provided for laterally positioning the web. A pair of rollers lie across the webbing on opposite sides of the web and pinch the webbing between them when they are moving the webbing one way or the other transverse to the direction of travel of the webbing. The rollers have only a limited degree of travel crosswise of the webbing so in the event they have not properly positioned the webbing when they reach this limit, they are separated, returned to a starting position, then again closed together to pinch the webbing and again moved across the webbing to position the webbing. These steps are repeated until the webbing is properly located. The positioning is accomplished by a single pair of rollers or by two cooperating pairs. When the rollers of one pair are closed together pinching the webbing, the rollers of the other pair are separated.

---

This invention is concerned with the field of treating, handling or otherwise processing a continuously moving elongated webbing. In particular, the invention is concerned with keeping the webbing flow along a relatively fixed line of travel.

Problems often arise in trying to keep a continuous elongated webbing continuously moving along a steady path. This is particularly true where the webbing material runs through a number of processing stations or is otherwise stretched out to such a length that supports must be provided at periodic intervals along its line of travel. The problems become more acute where the webbing travels lengthwise on edge. The difficulties manifest themselves in a variety of ways, for example, if the webbing is not suitably supported in position, it may have a tendency to buckle or flex sufficiently to damage itself. It may be that due to its weight, especially in the case of a metal webbing which is traveling longitudinally on edge, the webbing will have a tendency to drop down as it travels forward. This can present a serious problem where the various processing stations are set up to treat the webbing at a certain predetermined elevation. Unless the webbing is maintained at that elevation, damage to the processing system as well as to the webbing itself would likely occur. Other difficulties may occur in the event one of the longitudinal edges of the webbing, say, for example, the bottom edge, is being used as a reference guide from which to locate various processing steps. Any substantial shift in this reference edge could result in an unuseable end product due to faulty processing. Another possibility is that if the edge of the web has not been trimmed properly and somewhat precisely, the failure to take this into account and make corresponding adjustments to the elevation of the webbing would likewise produce unsatisfactory results.

As an example of a web processing system reference can be made to the copending application by Norman B. Mears which is assigned to the same assignee as the instant application, Ser. No. 433,950, filed Feb. 19, 1965, titled, System for Processing Continuous Webbing. As described more fully in that application, a metallic web travels lengthwise on end in a vertical plane through a series of processing stations including a coating chamber, a plurality of photoprinting frames, an etching chamber and a dryer in succession. It is easy to visualize then that unless this elongated webbing is kept at a relatively fixed vertical elevation, most if not all of the various problems which were mentioned above would be encountered. Specifically this could include the possibility of scratching or otherwise damaging the coating, photoprinting the various patterns in the wrong positions and the likelihood that the various equipments would become jammed or otherwise damaged.

It is the principal object of this invention to provide an apparatus for keeping a continuously moving elongated webbing traveling on a relatively fixed linear path thereby preventing most of the difficulties heretofore encountered in the handling of continuously moving elongated webbing.

Another object of this invention is to automatically compensate for any tendency of the continuous moving webbing to shift its path of travel by repositioning the webbing as the need arises.

Yet another object of this invention is to achieve the immediately foregoing object with an apparatus which will not damage the webbing in taking the corrective action.

Still a further object of this invention is to provide apparatus for use in a system for treating continuously moving elongated webbing which apparatus will keep a longitudinal edge of the webbing traveling along a relatively constant path.

Yet still another object of this invention is to provide an apparatus which can be used in a system for processing continuously moving elongated webbing which is traveling on edge to keep one edge of the webbing at a relatively constant elevation.

A further object of this invention is to provide an apparatus which automatically achieves the foregoing objectives by continually shifting the webbing back to its line of travel as it tends to drift away therefrom.

Yet another object of this invention is to achieve the foregoing object with an apparatus which may be limited in the degree of travel it can make in the direction necessary to shift the webbing.

A still further object of this invention is to achieve all of the foregoing objects with an apparatus which permits the webbing to continuously move without interruptions so that it can maintain its continuous travel through the processing system.

These and other objects and features of this invention will become apparent during the course of the following detailed description with reference to the accompanying drawings in which.

Figure 1:
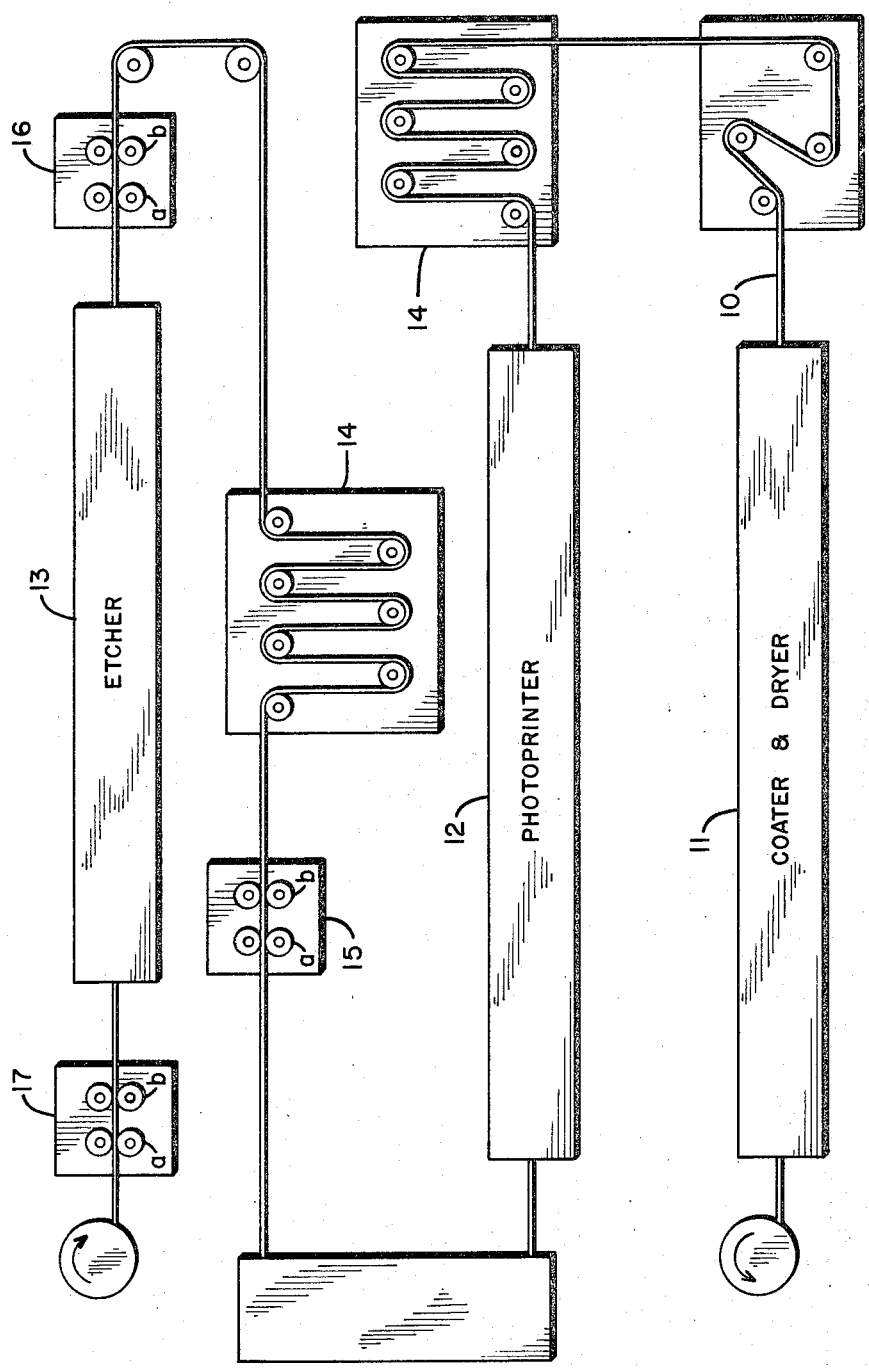
FIG. 1 illustrates in outline schematic form a top view of a system such as described in the copending Mears application, supra, which contains the preferred embodiment of this invention.

Referring first to FIG. 1, a metal web 10, which is observed along its upper edge only, passes sequentially through a coater and dryer 11, a group of photoprinters 12 and an etcher 13 where the webbing is subjected to various processing steps which are necessary to produce precision articles, for example, color TV picture tube aperture masks. The web 10 also passes through take-up mechanisms 14 which have the task of matching the intermittent operation of the photoprinters to the continuous operation of the other processing stations. The take-up mechanisms are not considered an essential part of the present invention although they are very necessary for overall system operation where this intermittent type of operation is encountered. Interspersed along the line of flow of the webbing 10 are three leveler tables or stands 15, 16 and 17 which constitute the structural embodiment of the instant invention in the preferred form. Although these leveler stands are virtually identical to one another, there is a slight variation. The principal purpose served by FIG. 1 is to show how the leveler stands 15, 16 and 17 are interspersed along the flow path of the webbing 10 and, in the system such as illustrated, to show that each of the mechanisms contained within the stands is made up of two units comprising two pair of rollers, respectively labeled a and b, with one roller of each pair located on an opposite side of the webbing 10. The minor variation among the three units 15, 16 and 17 is that in each of the pairs 15a and 15b one of the rollers is being continuously rotationally driven by a suitable drive motor so these units are known as driver rollers; in 16 none of the rollers is driven, therefore, these units are idler rollers; and in 17, one of the rollers of each of the units 17a and 17b is driven by a variable speed motor so that these are considered variable speed driver rollers. In addition, it may be advisable to include an adjustable braking system in one of the units, such as 16, to ensure a relatively taut web throughout the etcher 13. Furthermore, where the web may pass from one set of driver rollers at 17 to another set of driver rollers (not shown), the latter may require an adjustable slip clutch arrangement to compensate for any slight differences in drive rates. These are all variations which are readily adaptable by those of ordinary mechanical skill in the art.

Figure 3:
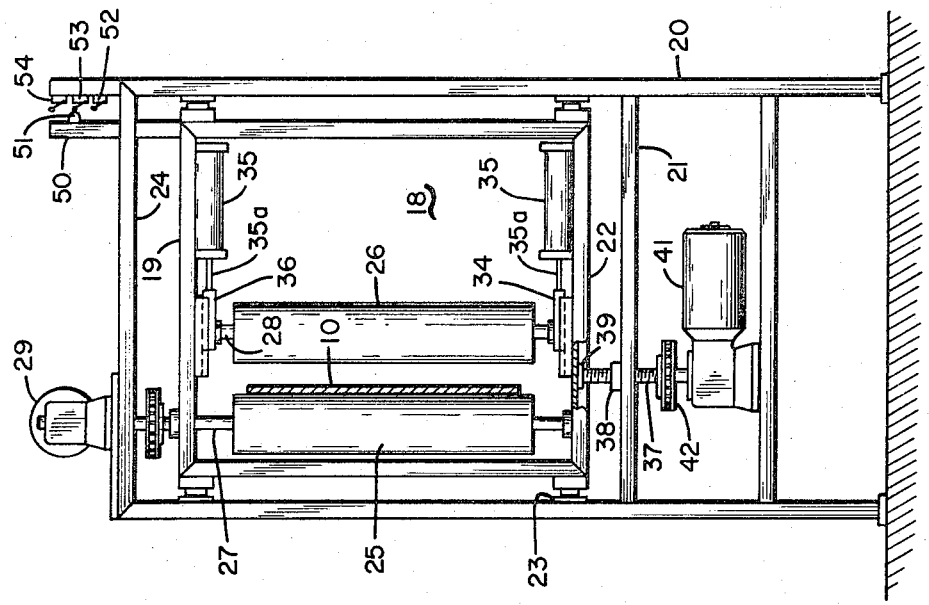
FIG. 3 is a front sectional view of the embodiment which is illustrated in FIG. 2.
Figure 2:
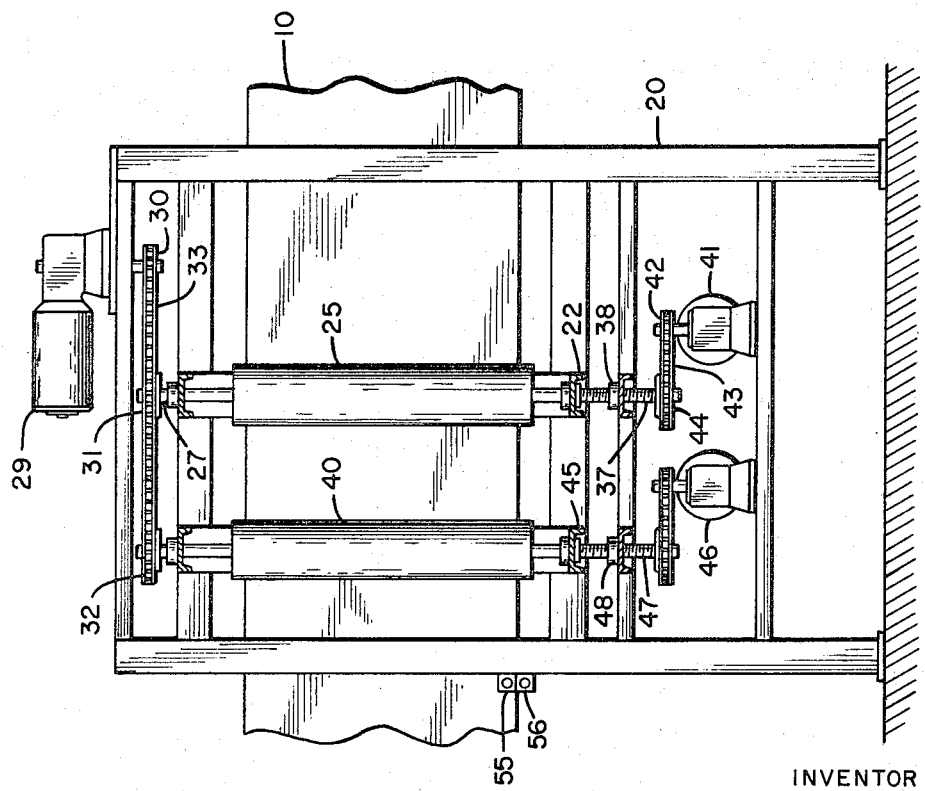
FIG. 2 is a side sectional view of the preferred embodiment of this invention.

Referring now to FIGS. 2 and 3, the detailed construction of the leveller stand 15 is illusrated. A rigid main frame assembly 20 is suitably anchored to the floor. At the lower part of the rigid main frame assembly 20 is attached a horizontal rigid bottom plate 21. Above the plate 21 is a frame 18 which can be moved vertically within the rigid frame 20 by sliding or rolling in the slots 23 which are formed in the side members of the main frame 20. A horizontal upper plate 24 extends across between the two side members of the main frame 20 above frame 18. The latter has an upper horizontal plate 19 and a lower horizontal support plate 22. Between the upper plate 19 and the support plate 22 are a pair of vertically disposed elongated rollers 25 and 26 whose shafts are journalled at their lower ends in any convenient manner. At its upper end shaft 27 of roller 25 passes up through the upper plate 19 and shaft 28 of roller 26 rests in a bearing which is mounted in a slide plate 36. The latter, in turn, is slidable back and forth along the underside of plate 19 in a suitable slot or groove. At the bottom end, shaft 28 rests in another slide plate 34 which is slidable toward and away from roller 25 along a slot or groove on the top surface of the lower support plate 22. A motor 29 is coupled to the upper extension of shaft 27 to rotate roller 25 as desired. The linkage between the motor 29 and the shaft 27 can be observed more clearly in FIG. 2. The motor 29 provides the driving power for one roller of each unit, each unit comprising a separate pair of rollers. Preferably, the linkage between the shaft of motor 29 and the rollers comprises a sprocket wheel 30 attached to the motor shaft, the sprocket wheels 31 and 32 attached respectively to rollers 25 and 40 and a drive belt or chain 33 interlinking the sprockets. The latter provides sufficient flexibility so that as the frame 18 with its support plate 22 raises and lowers in the manner to be later described, the coupling between the drive motor 29 and the respective driven rollers will be maintained during the travel of the rollers in the vertical direction.

Air cylinders 35, which are controllably actuated by suitable electrical control signals, drive slide plates 34 and 36 to move roller 26 back and forth as desired. When the air cylinders 35 are actuated so that their pistons 35a are extended, they drive the slide plates 34 and 36 in unison leftward until the webbing is pinched between rollers 25 and 26. Since the roller 25 is continually rotated by the motor 29 and roller 26 is free to rotate about its axis, the webbing 10 continues to be driven lengthwise through the various processing stations even while pinched between the rollers.

Toward the bottom of the apparatus, an elongated threaded shaft 37 is threaded upward through a nut 38 which is fixedly attached to the topside of the bottom plate 21. The support plate 22 of the movable frame 18 rests on the upper end of the threaded shaft 37 in a depression or guide hole 39 formed on the underside of plate 22. A motor 41 having sprocket 42 on its shaft is linked through a drive belt or chain 43 to a sprocket wheel 44 at the bottom end of the threaded shaft 37. When the motor 41 is energized it will cause the threaded shaft 37 to advance upward or withdraw downward through nut 38 thereby raising or lowering the frame 18 with its rollers 25 and 26. Each pair of rollers of the respective units has a separate vertical adjusting motor which can be observed in FIG. 2. The support platform 45 of the frame which contains drive roller 40 is raised and lowered by the action of motor 46 coupled through appropriate sprocket and drive chain linkage to the threaded shaft 47 which engages nut 48 attached at the upper side of plate 21. In this manner the movable frames for each of the respective pairs of rollers can be independently moved in the vertical direction or held stationary as called for. The linkages between the motors 41 and 46 and the sprocket wheels are also constructed with sufficient flexibility to enable the movable frames to travel vertically for a prescribed distance within the main frame 20 without disengaging any of the drive mechanisms. This manner of construction has eliminated the need for a more complex driving system which otherwise might have been necessary because of the need to move the positioning rollers vertically.

Extending upward at the upper right of the movable frame 18, as observed in FIG. 3, is an arm 50 which carries a switch actuator 51. The latter in turn actuates the switches 52, 53 and 54, which are fixedly attached to the main frame 20, as the frame 18 rises and falls. switches 52, 53 and 54, which are fixedly attached to upper limits of travel through which the frame 18 moves and switch 53 denotes the intermediate zero start position of the frame. These switches provide electrical signal indications which, in circuit with other devices, control the operation of the air cylinders 35 for driving the rollers together and the operation of the vertical positioning motors 41 and 46. Another part of the electrical control circuit is provided by a pair of photoelectric cells 55 and 56 which are mounted in any suitable manner to the main frame 20. These photocells are trained on the bottom longitudinal edge of the webbing 10 to sense or detect the location of this edge. If the light passage through both cells is blocked off by the webbing, the bottom edge is too low and corrective action must be taken to remedy this by lifting the web, whereas if the light passes through both of the cells the bottom edge is too high so that corrective action is needed to lower the web. Only when the light is shut off through the upper photocell 55 but yet allowed through the bottom photocell 56 is the vertical elevation of the web considered to be correct within allowable limits. The electrical circuitry of the photo-cells 55 and 56 is combined with that of the switches 52, 53 and 54 to provide the overall electrical control for selecting the appropriate vertical positioning motor and air cylinder to select the proper pair of rollers and to drive them in the appropriate direction for the corrective action as called for.

The following briefly describes the manner of operation of the apparatus. Assume initially that air cylinders 35 have driven rollers 25 and 26 together so that they pinch the moving webbing 10 between them, and that the photocells 55 and 56 detect that the bottom edge of the webbing 10 is too low. By suitable electrical circuitry the motor 41 is energized to rotate in the direction to cause the threaded shaft 37 to move upward through nut 38 raising the movable frame 18 so that the pinching rollers 25 and 26 tend to shift the webbing 10 upward while it continues its lengthwise travel. When the switch actuator 51 on the extended arm 50 of the movable frame 18 contacts the upper limit switch 54, there is provided an electrical signal indication that the movable frame 18 has reached its permissible upper limit of travel. Assuming that the photocells still indicate that the bottom edge of the webbing is too low, there results a variety of activities. For one, the air cylinders 35 are actuated to withdraw roller 26 away from roller 25 so that the webbing is free between these two rollers. At an instant or two before, the movable roller (not shown) of the pair of rollers in the other unit is driven by its associated air cylinders (not shown) so that the webbing is then pinched between it and roller 40. This is to make sure that the web at no time is unsupported. Along with this, motor 46 is energized to drive its associated threaded shaft 47 upward through the nut 48 so that the corrective upper shifting action of the webbing is continued by the second unit or pair of rollers. Lastly, the direction of motor 41 is reversed to withdraw the shaft 37 through the nut 38 to bring the movable frame 18 with rollers 25 and 26 down until it reaches its zero position as denoted by the switch actuator 51 contacting switch 53. In the event that the second pair of rollers during its course of upward travel while pinching the web still does not bring the lower edge of the web up to the desired vertical elevation before it reaches its upper limit of travel, when these rollers do reach that upper limit a suitable switch is tripped and the operation is again reversed so that the first unit or pair of rollers 25 and 26 again takes over the corrective action and the other pair of rollers is returned to its zero start position. It can be seen then that by alternating between the two sets of rollers for the corrective vertical positioning action, even though each set may be limited in travel distance, when used in the described combined manner, virtually any amount of corrective action that is necessary can be provided. To position the webbing downward when required, it is clear that the operation would be the same except that the lower limit switch 52 would come into play to denote the lower limit of allowable travel and provide the electrical indicating signal denoting when said lower limit is reached to bring the other set of rollers into the corrective action. Further, it can be seen that if one set of rollers is being driven upward and corrective downward action is called for before an upper limit is reached, direction can be reversed to shift the web downward.

Figure 4:
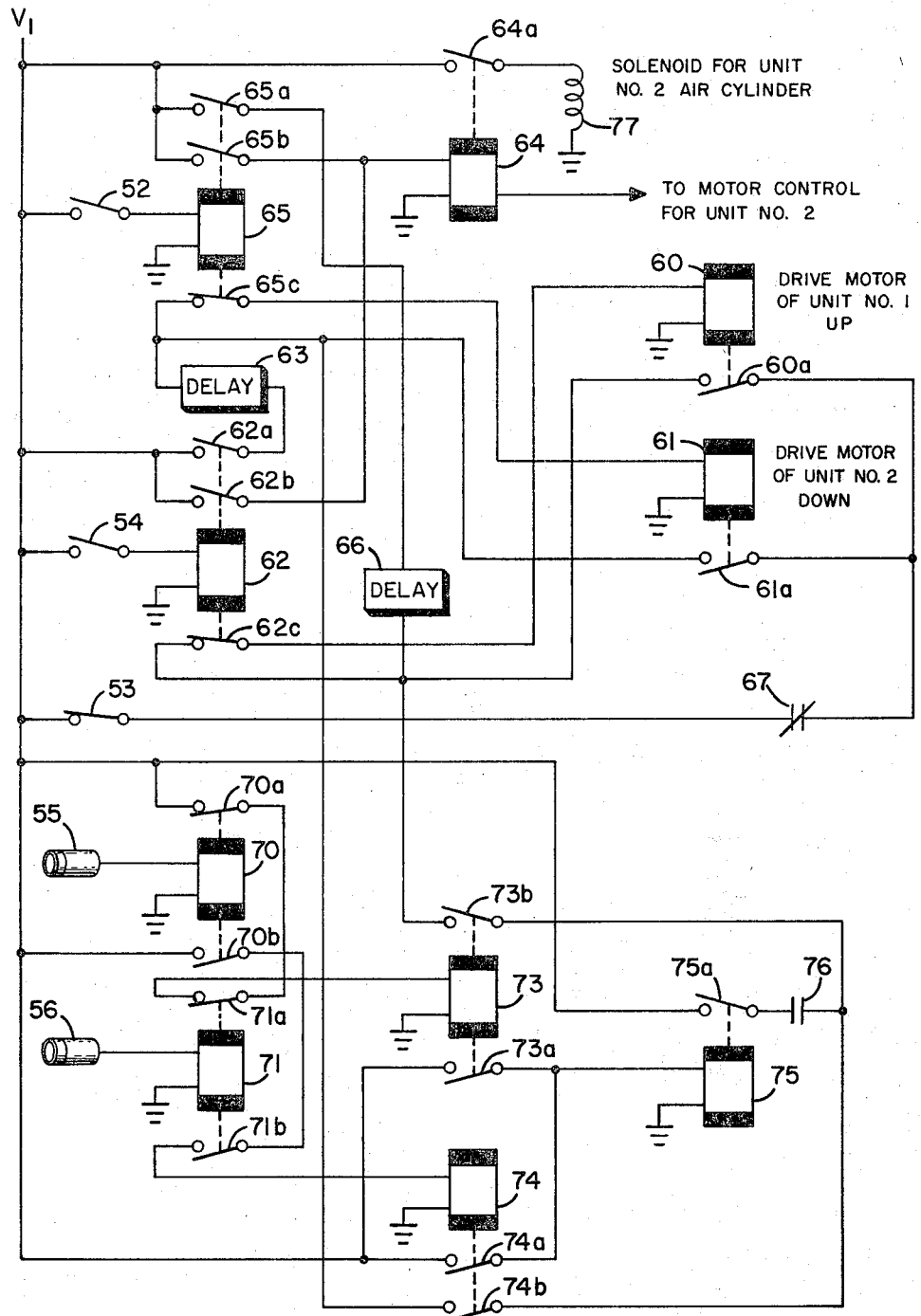
FIG. 4 is an electrical circuit diagram showing most of the electrical control circuit of the preferred embodiment.

Referring to the electrical circuit illustrated in somewhat schematic form in FIG. 4, there will now be described how the electrical signals which control the operation of the previously-described units are developed. For simplification and clarity, only certain parts of the electrical circuit for controlling one of the pair of rollers are shown but it will be apparent that the electrical control circuit for the other pair of rollers would be similar and operate in the same manner.

Relays 60 and 61 respectively control the operation of the vertical positioning motor, such as 41 (FIG. 3), for one of the units, hereinafter referred to as unit No. 1, to drive the movable frame with its associated pair of rollers in upward and downward directions. The precise manner in which these relays provide this control is not shown in the drawing. Suffice it to point out that when relays 60 and 61 are energized, the motor correspondingly drives the rollers upward or downward. There are two conditions for moving unit No. 1 vertically which are:

(a) when unit No. 1 has reached an upper or lower limit of travel and must be returned to its zero starting position; and (b) when the photocells 55 and 56 call for corrective action and the frame or rollers are not at one of their limits (providing, of course, that unit No. 2 is not active at that time).

Considering first condition (a) above, if unit No. 1 is at its upper limit closing switch contact 54 so that relay 62 is energized, a first normally open contact 62a closes providing a path from a suitable energy source, V1, through a delay circuit 63 and a normally closed contact 65c to energize relay 61 so that the vertical positioning motor for unit No. 1 operates to bring its rollers in the movable frame downward. The purpose of the delay circuit 63 is merely to ensure that the various actions are allowed to take place at suitable intervals so that opposing or conflicting actions aren't taking place at the same time. Normally closed contact 65c is merely a safety precaution to make sure that the frame isn't driven downward when it is already at its lower limit. The normally open contact 62b also closes to provide an energy path to relay 64 which is in the control circuit for the vertical positioning motor 46 of unit No. 2. A similar relay whose energization is controlled by the limit switches on unit No. 2 is contained in the control circuit for unit No. 1 and will be later described. It should be adequate here to merely point out that the function of relay 64 is to control the unit No. 2 motor. The normally closed contact 62c serves a function corresponding to that of the earlier-described normally closed contact 65c to prevent the frame from being driven upward when it is already located at its upper limit. Relay 65 operates in a similar manner and is energized by lower limit switch 52 of unit No. 1. One of its normally open contacts 65a is in circuit with a delay element 66 through the normally closed contact 62c to provide the energization of relay 60. The other of its normally open contacts, 65b, provides another energization path for relay 64 which controls, to a degree, the operation of the vertical positioning motor of unit No. 2. Each of the relays 60 and 61 provides a self latching or holding feature through a circuit including its respective normally open contacts 60a and 61a. The self-latching energization path is through the zero position switch 53 and a normally closed contact 67 of a relay which denotes that unit No. 2 is not at a limit. This circuit functions in a manner such that when unit No. 1 is not at a zero position and unit No. 2 is not at one of its limits, if either relay 60 or 61 is energized by the unit No. 1 frame reaching its limit, the relay will stay energized to bring the unit No. 1 rollers in their frame back to their zero position to be ready when needed. In the event that while unit No. 1 is being repositioned to zero unit No. 2 should reach a limit, contact 67 would open thereby removing the holding circuit to relays 60 and 61 so that they are now available to control the operation of the unit No. 1 motor to properly position the webbing as may be called for since unit No. 2 would not then be available.

Considering the next condition (b) for energizing the vertical positioning motor for unit No. 1 caused by the web drifting away from the preset vertical elevation, if the web has drifted too low so that the bottom longitudinal edge has exceeded an allowable lower limit, both of the photocells 55 and 56 will be covered so that their respectively associated relays 70 and 71 will be prevented from energizing. The circuit path then will be closed from energy source V1 through the normally closed contacts 70a and 71a to relay 73. In the event the bottom edge of the web is too high both of the photocells 55 and 56 will be energized so that their respective relays 70 and 71 will both be energized and the circuit path will be closed from V1 through normally open contacts 70b and 71b to relay 74. If either relay 73 or 74 is active, relay 75 is energized either through normally open contact 73a or 74a. When relay 75 becomes energized, normally open contact 75a closes the circuit path from the energy source V1 to provide an electrical signal indication that corrective action to suitably position the web must be taken. This signal, of course, must be directed to the control circuit for the proper motor, that is, to operate the vertical positioning motor of unit 1 or 2 so that the corrective action can be taken. Relay contact 76, which is normally open, is the counterpart of the earlier described relay contact 67. This contact is closed when the rollers or frame of unit No. 2 are at a limit which permits the electrical signal representation which calls for corrective action to reach the motor for unit No. 1. However, when unit No. 2 is no longer at one of its limits the relay contact 76 opens thereby opening the circuit path through that route to the vertical positioning relays for unit No. 1, 60 and 61. In other words, if unit No. 1 has not initiated corrective action as called for by photocells 55 and 56, unit No. 2 will take priority because contact 76 being open will prevent communication to relays 60 and 61.

From relay contact 76, the signal path takes two different routes. If the webbing is positioned too low the signal will take the path through normally open contact 73b (now closed) through normally closed contact 62c to relay 60 which causes the vertical positioning motor for unit No. 1 to drive in a direction to move the rollers of unit No. 1 upward. In the event the web is positioned too high, relay 74 is energized and relay 73 is deenergized so that the signal follows the other path from relay contact 76 through normally open contact 74b (now closed) and normally closed contact 65c to energize relay 61. The latter in turn causes the positioning motor for unit No. 1 to drive in a direction to move the rollers downward. In the event that only one of the relays 70 or 71 is energized it indicates that the web is at its desired vertical elevation within limits and therefore no corrective action signal is transmitted to cause the vertical positioning motors to move the webbing.

Referring back to relay 64, it has two additional contacts (not shown) which would operate in a manner similar to contacts 76 and 67 to provide control to the vertical positioning motor for unit No. 2. Furthermore, it contains a normally open contact 64a which is in circuit between the energy source V1 and the solenoid 77 for the unit No. 2 air cylinder, such as 35 (FIG. 3), for closing the rollers of unit No. 2 together. This should occur when unit No. 1 is at its upper or lower limit so that unit No. 2 can take over the corrective action. Relay 64 will be energized to close its normally open contact 64a either when relay 65 is energized, which takes place when unit No. 1 is at its lower limit, or when relay 62 is energized, which occurs when unit No. 1 is at its upper limit. In a similar fashion, of course, a corresponding relay to control the operation of the air cylinder for the rollers in unit No. 1 is also provided.

Although the foregoing has described in detail the electrical control circuitry, it should be recognized that this is only one manner of providing the various electrical signal indications for operative control of the units. In general, combinations of other electrical components and circuits can be satisfactorily designed provided they are arranged and connected together to operate functionally in the logical manner as taught by this invention. It should also be understood that in general various precautionary circuits are provided for safety and auxiliary manual controls may be included where desired.

I claim:

1. Apparatus for positioning a moving web, comprising: at least one pair of parallel rollers lying across the moving webbing, the rollers of said pair being located opposite one another on opposite sides of the webbing which is moving lengthwise; means for selectively moving the rollers toward and away from one another for respectively pinching the webbing and permitting it to run free as it travels between the rollers; means for selectively moving the pair of rollers while the rollers are pinching the webbing for positioning the webbing lateral to its direction of travel and while the rollers are separated for placing them at a starting location lateral to the direction of travel of the webbing.

2. The invention as described in claim 1 wherein said roller moving means moves said rollers axially.

3. Apparatus for automatically positioning a webbing which is continuously moving lengthwise, comprising: at least one pair of elongated rollers, said rollers lying across the webbing with their axes of rotation parallel to one another and being located opposite one another on opposite sides of the webbing as it travels lengthwise between the rollers; means for selectively moving the rollers toward or separated from one another whereby the webbing correspondingly is pinched or is free as it travels between the rollers; means for sensing the location of a longitudinal edge of the web with respect to a preset location; and means responsive to said sensing means for selectively moving the rollers axially while they are pinching the webbing when the longitudinal edge is beyond said preset location for moving the web laterally toward said preset location; and means for moving said rollers axially when separated for positioning them to a starting location when they have reached the limit of their axial travel while positioning the web.

4. For automatically controlling the position of an elongated webbing while it moves continuously lengthwise and on edge, apparatus comprising: first and second pairs of rollers adjacent one another with one pair located just downstream of the other, the two rollers of each pair having parallel axes and located opposite one another on opposite sides of the webbing and disposed across the width of the webbing; means for selectively closing together or separating the rollers in each pair whereby the webbing correspondingly is pinched or is free as it travels between the rollers of the respective pairs; means for selectively moving each pair of rollers axially over a limited distance; and control means coupled to said selective closing means for causing the latter to mutually exclusively pinch the webbing with one of the pair of rollers.

5. Apparatus for automatically controlling the vertical positioning of an elongated web while it is moving on edge lengthwise in a vertical plane, comprising: first and second pairs of vertical rollers, one roller of each pair located on one side of the web and the other roller of each pair located opposite the one roller on the other side of the web; each pair of rollers being journaled at one end in separate supporting plates which are movable in a vertical direction for moving the rollers axially; said one roller of each pair being selectively movable in its corresponding supporting plate toward or away from its corresponding other roller for respectively pinching the web or leaving it free as it continuously travels therebetween; and means for mutually exclusively pinching the webbing with one or the other of said pairs of rollers while the supporting plates are being moved vertically.

6. Apparatus for automatically controlling the vertical positioning of an elongated web while it is moving on edge lengthwise in a vertical plane, said apparatus comprising: first and second pairs of vertical rollers adjacent one another, one roller of each pair located on one side of the web and the other roller of each pair located opposite its corresponding one roller on the other side of the web; each of said pair of rollers being mounted on end on separate supporting plates which are movable vertically for moving the respective pairs of rollers axially over a limited distance; separate drive means associated with each roller pair for selectively moving said one roller of each pair in its supporting plate toward and away from its corresponding other roller for respectively pinching the web or allowing it to be free as it travels between the rollers; control means for said drive means for causing the latter to move one of the pairs of rollers to the pinching condition and the other pair to the free condition; means for sensing the location of a longitudinal edge of the web with respect to a preset location and for developing a corrective signal indication when said edge is beyond said preset location; and means responsive to said corrective signal indication for moving the supporting plate of the pinching pair of rollers in a vertical direction for correcting the vertical position of the web.

7. The invention as described in claim 6 further including: limit sensing means coupled to said control means for sensing when said one pair of rollers reaches a limit of vertical travel whereby said control means causes said drive means to move the other pair of rollers to the pinching condition and the one pair of rollers to the free condition.

8. Apparatus for automatically controlling the vertical positioning of a continuous, elongated metal web while it is moving on edge lengthwise in a vertical plane, said apparatus comprising:
  A. first and second vertical positioning means located adjacent one another at a fixed position lengthwise of the web, each of said positioning means comprising:
    (1) a pair of elongated vertical rollers located opposite one another on opposite sides of the moving web, said rollers mounted on end on a vertically movable mounting plate;
    (2) first drive means for controllably raising and lowering the mounting plate for moving the rollers axially, and
    (3) second drive means for controllably closing together or separating the rollers for respectively pinching the web or leaving it free as it continuously travels between the rollers,
    (4) each of said pair of rollers having an upper and lower limit of travel and an intermediate zero position between said limits;
  B. control means for said second drive means for causing the second drive means of one of the positioning means to close its rollers and the other second drive means to separate its rollers;
  C. means for sensing when a longitudinal edge of the moving web is beyond a preset vertical position and for causing the first drive means of the positioning means which contains the closed rollers to move its rollers axially for shifting said edge of the web toward said preset position;
  D. means coupled to said control means for sensing when the rollers in the positioning means being vertically driven to shift the web reach a limit of their travel for causing said control means means to reverse the operation of the second drive means whereby the rollers of said one positioning means are separated and the rollers of said other positioning means are closed.

9. Apparatus for automatically controlling the vertical positioning of a continuous elongated metal web while it is continuously moving lengthwise on edge in a vertical plane through a series of processing stations, said apparatus comprising:
  A. first and second vertical positioning means located adjacent one another at a fixed position lengthwise of the webbing, each of said positioning means comprising,
    (1) a pair of elongated rollers located opposite one another on opposite sides of the moving web, said rollers mounted on end on a vertically movable mounting plate,
    (2) first drive means for controllably raising and lowering the mounting plate for moving the rollers axially, and
    (3) second drive means for controllably closing together or separating the rollers for respectively pinching the web or leaving it free as it continuously travels between the rollers,
    (4) each of said pair of rollers having an upper and lower limit of travel and an intermediate zero position between said limits; and
  B. control means coupled to said vertical positioning means, comprising,
    (1) position sensing means for sensing the location of a longitudinal edge of the moving web relative to a preset location;
    (2) limit sensing means for sensing when the rollers have reached an allowable limit of travel;
    (3) and means combining said position sensing means and said limit sensing means and connecting them to the positioning means in a manner such that when the former senses that said edge of the web is beyond the preset location the second drive means for one of the positioning means is activated to close its rollers and the first drive means for said one positioning means is activated to move said closed rollers axially for moving the webbing toward the preset location while the second drive means for the other positioning means is activated to open its rollers and the first drive means for said other positioning means is activated to move its opened rollers axially to their zero position until said limit sensing means senses that the rollers in said one positioning means have reached their allowable limit of travel whereby the drive means in the respective positioning means are activated to the reverse conditions.

10. Apparatus for automatically positioning an elongated continuous metal web while it is moving lengthwise on edge in a vertical plane through a series of processing stations, said apparatus comprising:
  A. first and second pairs of vertical rollers adjacent one another and fixedly positioned with respect to the direction of travel of the web, the rollers of each pair located opposite one another on opposite sides of the moving web and mounted on end in vertically movable supporting plates;
  B. first drive means for each of said pair of rollers for controllably closing together or separating the rollers thereby respectively pinching the web or allowing it to be free while it travels between the rollers;
  C. second drive means for each of said supporting plates for controllably raising and lowering the pairs of rollers between an upper limit, a lower limit and an intermediate zero position;
  D. an energizing source for said first and second drive means;
  E. control means for selectively controlling the operation of said first and second drive means, said control means comprising,
    (1) position sensing means for determining the location of a longitudinal edge of the moving web relative to a preset location,
    (2) limit sensing means for each of the pairs of rollers for determining when the respective pairs are at their upper limit, lower limit and intermediate zero position,
    (3) and circuit means interconnecting said position sensing means and said limit sensing means between said energizing source and the first and second drive means so that
      (a) when the first drive means is energized to close one pair of rollers and separate the other pair of rollers and the position sensing means senses that the web is beyond the preset location,
      (b) the second drive is energized to move said one pair of rollers in a direction shifting the web toward the preset location and to move said other pair of rollers to its intermediate zero position, and
      (c) when the limit sensing means senses that said one pair has reached a limit and said other pair has reached its intermediate zero position,
(d) the first drive means is energized to separate said one pair of rollers and to close said other pair of rollers, and
(e) the second drive means is energized to move said one pair toward the intermediate zero position and to move said other pair in a direction shifting the web toward the preset location.

11. In a system for processing continuous flat webbing which is continuously moving lengthwise with one edge above the other through a series of processing stations, apparatus for keeping one edge at a relatively constant vertical elevation, said apparatus comprising: two pair of elongated rollers located adjacent one another at a fixed location lengthwise of the webbing, said rollers lying parallel to one another across the width of the webbing with one roller of each pair on opposite sides of the webbing; means for selectively closing together the rollers of one or the other of the pairs of rollers for pinching the webbing as it travels therebetween; means for sensing when the vertical elevation of one longitudinal edge of the webbing is beyond a predetermined vertical elevation; and means responsive to said sensing means for moving the pinching pair of rollers axially in a direction to move said webbing edge vertically toward said predetermined vertical elevation.

References Cited

UNITED STATES PATENTS

| 2,827,809 | 3/1958 | Beam | 226—19 X |
| 3,147,898 | 9/1964 | Huck | 74—241 X |
| 3,268,140 | 8/1966 | Rouyer | 226—18 |

FOREIGN PATENTS 622,827　5/1949　Great Britain.

M. HENSON WOOD, JR., *Primary Examiner.*

R. A. SCHACHER, *Assistant Examiner.*